United States Patent
Hölter

[11] 4,003,722
[45] Jan. 18, 1977

[54] PROCESS AND ARRANGEMENT FOR THE REMOVAL OF IMPURITIES FROM GASES

[76] Inventor: Heinz Hölter, Beisenstr. 39, 439 Gladbeck, Germany

[22] Filed: Oct. 11, 1974

[21] Appl. No.: 514,283

[52] U.S. Cl. .................................. 55/68; 55/228
[51] Int. Cl.² ...................................... B01D 47/06
[58] Field of Search .......... 55/68, 84, 85, 89, 228; 260/63, 68

[56] References Cited
UNITED STATES PATENTS

| | | | |
|---|---|---|---|
| 3,590,555 | 7/1971 | Wackernagel | 55/89 X |
| 3,624,984 | 12/1971 | Ferrari et al. | 55/85 |
| 3,665,678 | 5/1972 | Kammermeyer et al. | 55/68 |
| 3,733,778 | 5/1973 | Hungate et al. | 55/89 |
| 3,762,133 | 10/1973 | Merriman et al. | 55/68 X |

Primary Examiner—Frank A. Spear, Jr.
Assistant Examiner—Ethel R. Cross
Attorney, Agent, or Firm—Michael J. Striker

[57] ABSTRACT

A cleansing liquid is conveyed along a first closed circuit which includes a scrubbing device. Here, the liquid comes into contact with and scrubs an impurity-containing gas so that the impurities in the gas are transferred to the liquid. When the concentration of impurities in the liquid has increased to a sufficient extent, the impurity-laden liquid is admitted into a second closed circuit which communicates with the first circuit. The second circuit includes an evaporator in which the impurities contained in the liquid are caused to evaporate from the latter. The purified liquid is recycled to the first circuit while the evaporated and highly concentrated impurities are admitted into a combustion chamber and burned.

14 Claims, 1 Drawing Figure

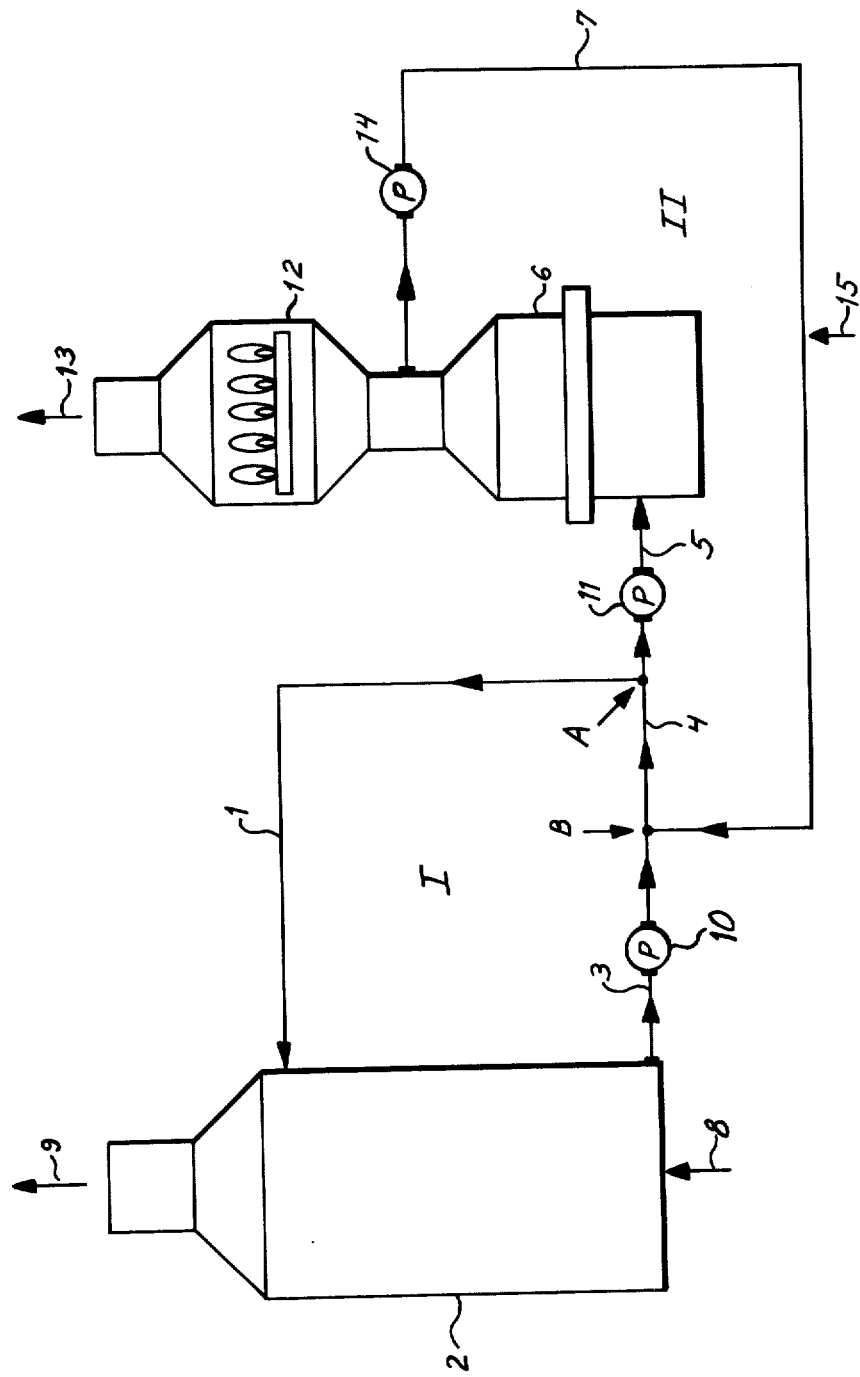

PROCESS AND ARRANGEMENT FOR THE REMOVAL OF IMPURITIES FROM GASES

BACKGROUND OF THE INVENTION

The invention relates generally to the removal of undesired components from fluids.

Impurities in air, which are detectable as odors, today pose a continuously increasing environmental problem. The sources of these nuisances range from animal breeding establishments to reconditioning plants for the clarification of sediment to foundries in which, for instance, formaldehyde must be driven off. The impurities are often in the form of vapors and, even when present in the most minute concentrations, are already effective for causing a considerable nuisance.

As a rule, the present state of the art offers three distinct and separate methods for the removal of such impurities. These are as follows: (1) The so-called combustion method; (2) The activated carbon filtering method; and (3) The wash method.

Each of these three methods, however, possesses certain disadvantages. Insofar as the combustion method is concerned, there exists the problem that, even when only the most minute traces of impurities are present in a gas, it is necessary to subject the entire quantity of gas to combustion. This results in enormously high energy expenditures.

In contrast, the method using activated carbon is economically feasible only when the concentration of impurities is very low. The reason resides in the fact that the cost of activated carbon is very high.

The so-called wash method using water or leaching solutions such as, for instance, soda lye in those cases where phenols and formaldehyde are driven off, exhibits the following disadvantages: Where the wash is effected using water alone, it is necessary for the discharged water to contain such a small quantity of impurities that the collected impurities are not again liberated.

On the other hand, where the wash is effected using a leaching solution, it is necessary to chemically prepare the lye or acid washing solution. Normally, this preparation cannot be undertaken at the location where the impurities are driven off and, consequently, it is necessary to prepare the washing solution at a chemical plant and to then transport it to such location. This involves very high transportation costs. In addition, there is the consideration that, at present, there is no chemical plant on the European market which advertises itself as ready to prepare lyes such as, for instance, soda lye, the latter which is used for washing out phenols and formaldehyde.

SUMMARY OF THE INVENTION

It is, therefore, a general object of the invention to provide a novel process and arrangement for the removal of undesired components from fluids.

Another object of the invention is to provide a process and arrangement which permit undesired components to be removed from fluids more economically than was possible heretofore.

A further object of the invention is to provide a process and arrangement which permit undesired components to be removed from fluids with a lesser expenditure of energy than was possible until now.

An additional object of the invention is to provide a process and arrangement which permit undesired components to be removed from fluids in a more effective manner than was possible heretofore.

It is also an object of the invention to provide a process and arrangement for the removal of undesired components from fluids, and particularly for eliminating odors, whereby the prior art problems outlined above are reduced to a minimum.

In pursuance of these objects, and of others which will become apparent, the invention provides a process for the removal of undesired components, particularly odor-causing components, from fluids wherein a cleansing fluid is conveyed along a closed flow system. The cleansing fluid is contacted with an impurity-containing fluid medium in at least one portion of the system so as to permit at least partial transfer of impurities from the fluid medium to the cleansing fluid. The transferred impurities are at least partially separated from the cleansing fluid in another portion of the system and the thus-purified cleansing fluid is then recycled.

By utilizing the invention, it becomes possible to obtain the impurities in higher concentrations than can be achieved with the prior art. Moreover, the use of a closed system according to the invention permits the cleansing or washing fluid to be conserved and it is only necessary to replace such cleansing fluid as is lost by evaporation.

Advantageously, the impurities separated from the cleansing fluid are combusted and this may be accomplished subsequent to withdrawal of the separated impurities from the closed system. Separation of the impurities from the cleansing fluid may be achieved by causing evaporation of the impurities from the cleansing fluid and such evaporation may be effected by heating the impurity-laden cleansing fluid.

In accordance with a favorable embodiment of the invention, the closed system includes two paths and contact of the cleansing fluid with the fluid medium from which impurities are to be removed is effected in one of these paths while separation of the impurities from the cleansing fluid is effected in the other of the paths. The operation of contacting the cleansing fluid with the fluid medium may comprise a scrubbing operation and transfer of impurities from the fluid medium to the cleansing fluid may be by absorption of the impurities by the cleansing fluid. Of particular interest to the invention is the case where the fluid medium from which impurities are to be removed is in the form of a gaseous substance and the cleansing fluid is a liquid, e.g., the removal of odor-causing impurities from air with water, soda lye or an aqueous suspension of activated carbon.

The invention further provides an arrangement for the removal of undesired components, particularly odor-causing components, from fluids which comprises means defining a closed flow system for a cleansing fluid. The flow system defining means includes at least one portion for effecting contact between the cleansing fluid and an impurity-containing fluid medium so as to permit transfer of impurities from the fluid medium to the cleansing fluid. The flow system defining means further includes another portion for effecting separation of the transferred impurities from the cleansing fluid. Means for conveying the cleansing fluid along the closed system and for recycling the cleansing fluid which has been purified in the last-mentioned portion of the closed system is also provided.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

The single FIGURE is a diagrammatic representation of one form of an arrangement in accordance with the invention which may be used for carrying out the process of the invention.

DESCRIPTION OF THE PREFERRED EMBODIMENTS

Referring now to the FIGURE, it may be seen that the exemplary arrangement illustrated therein includes a closed system defined by a conduit 1, a washing tower or scrubbing device 2, conduits 3, 4 and 5, an evaporator or vaporizer 6 and a conduit 7. In accordance with the invention, a cleansing or washing fluid is accommodated in the closed system.

A closed system as used herein may include one or more closed fluid flow paths or circuits and, in the present instance, it may be seen that the closed system comprises two closed flow circuits, namely, a flow circuit I and a flow circuit II. The flow circuit I is defined by the conduit 1, the scrubbing device 2 and the conduits 3 and 4. The flow circuit II is defined by the conduits 4 and 5, the evaporator 6 and the conduit 7.

In order to provide for a better understanding of the invention, the process according to the invention will be described with reference to the FIGURE using the purification of a gas by means of a liquid cleansing fluid as an illustration. Crude gas to be purified, that is, an impurity-containing gas, is admitted into the scrubbing device 2 as indicated by the arrow 8 and leaves the scrubbing device 2 as indicated by the arrow 9. During its passage through the scrubbing device 2, the gas comes into contact with the cleansing liquid being conveyed along the flow circuit I by means of a pump 10. As a result, impurities contained in the gas are transferred to the cleansing liquid so that the gas leaving the scrubbing device 2 is purified with respect to the gas entering the latter. The cleansing liquid may, for instance, be water, soda lye or, in accordance with a further improvement according to the invention, an aqueous suspension of activated carbon. It will be understood that the terms fluid and liquid as used herein are intended to encompass suitable suspensions or dispersions such as that just mentioned.

After a suitable operating period, for example, when the concentration of impurities in the cleansing liquid reaches a predetermined level, a part of the cleansing liquid is, in accordance with the invention, withdrawn from the flow circuit I and admitted into the flow circuit II by means of a pump 11. This transfer of contaminated cleansing liquid from the flow circuit I to the flow circuit II takes place at the location indicated by A and, although this has not been illustrated for the sake of clarity, it will be appreciated that suitable valve means may be provided at the location A for regulating the flow of cleansing liquid between the flow circuits I and II as well as along the flow circuit I. Of course, instead of operating for a certain period with the valve means at the location A preventing the flow of contaminated cleansing liquid to the flow circuit II, it is also possible to adjust the valve means in such a manner that some quantity of contaminated cleansing liquid continuously flows from the flow circuit I into the flow circuit II.

The pump 11 conveys the contaminated or impurity-laden cleansing liquid to the evaporator 6. Here, impurities contained in the cleansing liquid are caused to be vaporized, that is, evaporation of impurities from the contaminated cleansing liquid is effected in the evaporator 6. This evaporation may be accomplished by heating the contaminated cleansing liquid in the evaporator 6.

The impurities liberated in the evaporator 6 are conveyed into a burner or combustion chamber 12 communicating with the evaporator 6 by suitable means such as, for instance, an exhaust fan, which has not been illustrated for the sake of clarity. The odor-causing or other harmful impurities are then combusted in concentrated form in the burner 12 and the combustion gases withdrawn from the latter as indicated by the arrow 13.

The cleansing liquid in the evaporator 6 which has been freed of impurities is withdrawn from the latter by means of a pump 14. The pump 14 conveys the purified cleansing liquid along the conduit 7 and back to the flow circuit I for re-use, that is, the purified cleansing liquid is recycled. The purified cleansing liquid re-enters the flow circuit I at the location indicated at B and, although this has again not been illustrated for the sake of clarity, it will be appreciated that valve means may be provided at the location B for regulating re-entry of the recycled cleansing liquid into the flow circuit I. Such valve means might also be desirable as an aid in regulating the flow of cleansing fluid along the flow circuit I.

A make-up line 15 may be provided for the purpose of compensating for losses of cleansing liquid from the closed system which may occur by evaporation.

It may be seen that the invention has provided a process which is eminently suitable for the elimination of odors and absorbable harmful substances and wherein the cleansing fluid cycle is undertaken via closed containers and conduits. Advantageously, only a single open location is provided in the region of which there occurs an evaporation through the production of heat and which is in communication with a burner or combustion chamber so that vaporized harmful substances may be combusted in concentrated form. It will be appreciated, in this connection, that the terms closed system and closed circuit as used herein are not intended to necessarily imply systems or circuits which are completely out of communication with their surroundings. According to a particularly favorable embodiment of the invention, the cleansing fluid comprises an aqueous suspension or dispersion of activated carbon or coal.

It is self-understood that the invention is not limited to the specific embodiments illustrated and described but that numerous modifications are possible without, however, departing from the inventive concept. The latter, in one aspect, comprises scrubbing or washing out an impurity-containing fluid medium such as a gas and maintaining the cleansing fluid in a closed circuit; drawing off from the closed circuit, by means of a pump, for example, a quantity of cleansing fluid which, as opposed to the prior art processes, is highly concentrated; forwarding the quantity of cleansing fluid to an evaporator; burning the harmful and odor-causing substances in concentrated form; and returning the purified cleansing fluid to the closed circuit, for instance, by means of a pump. In this manner, no cleansing fluid need be lost in the overall process and it is only necessary to replace losses occurring by evaporation.

It will be understood that each of the elements described above, or two or more together, may also find a useful application in other types of processes and arrangements differing from the types described above.

While the invention has been illustrated and described as embodied in a process and arrangement for the removal of impurities from gases, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore such adaptations should and are intended to be comprehended within the meaning and range of equivalence of the following claims.

What is claimed as new and desired to be protected by Letters Patent is set forth in the appended claims:

1. A process for the removal of undesired components, particularly odor-causing components, from fluids, comprising the steps of conveying a cleansing fluid along a closed flow system; contacting the cleansing fluid with an impurity-containing fluid medium in at least one portion of said system so as to permit at least partial transfer of impurities from said fluid medium to said cleansing fluid; evaporating the impurity-laden cleansing fluid in another portion of said system so as to effect at least partial separation of the impurity-laden cleansing fluid into an impurity constituent and a purified cleansing fluid constituent; collecting said purified cleansing fluid constituent; combusting said impurity constituent subsequent to said separation; and recycling said collected and purified cleansing fluid constituent by withdrawing at least part of the latter from said other portion of said system and thereupon conveying said withdrawn cleansing fluid constituent towards said one portion of said system so as to conserve the amount of cleansing fluid employed in said closed system.

2. A process as defined in claim 1, said system including closed first and second paths; and wherein said transfer is effected in said first path and said step of evaporating is effected in said second path.

3. A process as defined in claim 1, wherein said step of evaporating comprises heating the impurity-laden cleansing fluid.

4. A process as defined in claim 1, wherein said contacting comprises scrubbing said fluid medium with said cleansing fluid.

5. A process as defined in claim 1, wherein said transfer comprises absorption of said impurities by said cleansing fluid.

6. A process as defined in claim 1, wherein said fluid medium comprises a gaseous substance and said cleansing fluid comprises a liquid.

7. A process as defined in claim 1, wherein said cleansing fluid comprises an aqueous suspension of activated carbon.

8. A process as defined in claim 1, wherein said cleansing fluid comprises water.

9. A process as defined in claim 1, wherein said cleansing fluid comprises soda lye.

10. An arrangement for the removal of undesired components, particularly odor-causing components, from fluids, comprising means defining a closed flow system for a cleansing fluid, said means including at least one portion for effecting contact between said cleansing fluid and an impurity-containing fluid medium so as to permit transfer of impurities from said fluid to said cleansing fluid, and said means also including another portion for effecting evaporation of the impurity-laden cleansing fluid so as to at least in part separate the latter into an impurity constituent and a purified cleansing fluid constituent; means for collecting the purified cleansing fluid constituent; means for combusting said impurity constituent subsequent to said separation; and means for recycling said collected and purified cleansing fluid constituent by withdrawing at least part of the latter from said other portion of said system and thereupon conveying said withdrawn cleansing fluid constituent towards said one portion of said system so as to conserve the amount of cleansing fluid employed in said closed system.

11. An arrangement as defined in claim 10, said system including closed first and second paths; and wherein said one portion is arranged in said first path and said other portion is arranged in said second path.

12. An arrangement as defined in claim 10, wherein said evaporating means comprises heating means.

13. An arrangement as defined in claim 10, wherein said one portion comprises scrubbing means.

14. An arrangement as defined in claim 10, wherein said conveying and recycling means comprises pump means.

* * * * *